Patented May 6, 1941

2,240,969

UNITED STATES PATENT OFFICE 2,240,969

PERTUSSIS TOXIN AND TOXOID

Edwin F. Voigt, Pearl River, and Sara W. Phillips, Spring Valley, N. Y., assignors to Lederle Laboratories, Inc., Pearl River, N. Y., a corporation of Delaware No Drawing. Application August 19, 1937, Serial No. 159,912

4 Claims. (Cl. 167—78)

This invention relates to pertussis toxin and toxoid and to methods of preparing the same.

The subject of immunization against whooping cough and the treatment of this disease has been given extensive study. The results obtained heretofore have not been especially effective and the need for suitable materials for immunization against whopping cough is obvious in view of the prevalency of this ailment.

We have discovered a method of preparing pertussis toxin and toxoid which have been proven effective both clinically and bacteriologically. This is accomplished by growing cultures of pertussis bacilli in suitable media and under proper conditions to give a pertussis toxin and from which toxin, a toxoid can be prepared.

The following is a preferred form of our method which is given by way of illustration and not in limitation:

Cultures of pertussis bacilli are grown in shallow layers (about ½ inch) of soluble-starch broth in an atmosphere containing about 20% carbon dioxide and 80% oxygen. This growing or incubation period extends over about 48 hours at a temperature of about 37° C. At the end of this period of time, the bacteria are separated from the broth by a filtration operation through paper and then through a Berkefeld or Mandler filter to give a bacteria-free filtrate, the bacteria remaining on the filters. The filtrate constitutes the toxin and if it is to be used as such, it is suitably preserved by the addition of phenol, a mercurial preservative, or some similar material.

If the toxoid is desired, it is prepared by adding about 0.3% (by volume) formalin (40%) to the unpreserved toxin, prepared as described above, and incubating this mixture at a temperature of about 40° C. for 2 to 4 weeks. This toxoid is then preserved by the addition of a preservative material as is described for the toxin.

The pertussis toxin prepared as described may be used as a skin test for determining susceptibility to whooping cough. The pertussis toxoid may be used for immunization against or for the treatment of whooping cough.

In place of using soluble starch, the bacilli may be grown in any suitable vegetable extract broth, the potato extract being especially effective for this purpose. However, it is important that the broth be used in shallow layers, say not over 1 inch. Another medium for incubation of the bacilli is semi-solid agar and this can be used in thicker layers, say, about 2 inches.

The atmosphere in which the incubation takes place is preferably one containing a mixture of carbon dioxide and oxygen in substantial quantities although the proportions thereof are not necessarily limited to those given in the specific example. As a matter of fact the incubation may be carried out in ordinary air if desired.

The time and temperature for incubation are also subject to some variation although the 48 hour period is approximately the minimum for commercial production at the temperature utilized. Any considerable extension of this period may cause undesirable side reactions.

In preparing the toxoid the amount of the formalin which may be used may be changed from that given although it is obviously undesirable to use more formalin than is required to detoxify the toxin. The time and temperature used for the detoxification is also subject to some variation.

Our toxin and toxoid have proved themselves effective in clinical and bacteriological tests on rabbits and humans. When our toxin is injected intradermally into rabbits, there is produced a swelling and erythema in dilutions up to 1–100 and in most cases, the undiluted toxin causes necrosis somewhat similar to that produced by the injection of whole cultures. The toxoid produced by our detoxification treatment, upon injection into rabbits, produces antibodies which neutralize the toxin, as evidenced by injections of such toxin. Our toxoid also neutralizes the necrotic factor of whole cultures as evidenced by the lack of necrosis when live cultures are injected into rabbits previously immunized with the toxoid. It is evident that our toxoid injections produce something akin to a true antitoxin with its attendant immunity.

In a series of clinical studies under the direction of competent pediatricians, our pertussis toxoid has been found especially effective for the early treatment of active cases of whooping cough. It has also been found effective as a prophylactic in cases that have been directly exposed to the disease. If used early in treatment or soon after exposure in contact cases, the immunological response to our toxoid is sufficiently rapid to prevent or modify the disease in the large majority of cases.

In one series of tests a confirmed clinical and laboratory diagnosis of whooping cough was made on a total of 160 treated cases, divided into three groups. The first group containing 53 cases were treated during the first or second week after onset and before paroxysms had developed. In the second group, 70 cases were treated during the third or fourth week of the infection in which there was already some degree of whooping and vomiting. In the third group there were 37 cases in which treatment was begun during the fifth week of the disease. Of the first group treated 92% of the cases did not develop whooping or vomiting and of these who did not develop severe symptoms 61% cleared up entirely after the fourth injection (each dose 1.5 cc. every other day). In several instances there was complete cessation of symptoms within 2 or 3 days when treatment was begun in the early stages and while this may be due to an unusually prompt increase in antibody such as may occur when a partially immunized person is injected with antigen, it also suggests the possibility that our pertussis toxoid produces a desensitizing effect which may be responsible, in some measure, for its curative effect.

In the second group, all symptoms disappeared after the fourth injection in 43% of the individuals treated, so that the diagnosis, by another observer, was extremely difficult. In the remainder of this group the results were varied but in each case there was marked improvement, the disease continuing to run a mild, modified course.

Those cases that were treated during the fifth week of the disease were refractory to treatment.

In none of treated cases was there any evidence of an interstitial or a broncho-pneumonia. Obviously the earlier the treatment is instituted for exposed cases or in children suffering from the infection, the greater the opportunity to effect an immunity in time to prevent the disease or to modify its course. Among 140 children not directly exposed, who had received the complete prophylactic treatment, 3 developed mild and a typical whooping cough within three weeks after the last injection. Two of these 3 cases occurred in families where non-immunized children suffered typical and severe whooping cough. Of 10 intimate contacts who received our pertussis toxoid immediately after exposure, all with the exeception of 2 escaped the disease and even these 2 were mild in character.

Naturally the dosage may be varied to meet conditions. The following table indicates the average dosage but, of course, may be varied if desired:

Dosage

For curative use: 3 to 5 injections, 2 cc. every other day.

For treatment of exposed contacts: 3 injections, 2 cc. every other day.

For general prophylactic use: (children not directly exposed), 3 injections, 2 cc. each at weekly intervals.

On the whole, the reactions from the injections have been extremely mild or almost completely lacking. Where there is any objectionable reaction, it responds promptly to suitable treatment and it is possible to continue injection using an increased number of doses of smaller amounts of the toxoid.

It is sometimes desirable to prepare a vaccine-toxoid mixture to be used to give anti-bacterial immunity as well as the anti-toxic immunity. Such a mixture can be prepared by taking the broth after incubation and detoxifying it without filtration, using formalin for this purpose, as already described. This treatment detoxifies the bacteria as well as the toxin. Additional vaccine, independently prepared, may be added, if desired. Still another way in which the mixture can be made up is to mix toxoid and vaccine, each prepared separately.

It is evident that other suitable changes and variations may be adopted in carrying out our process without departing from the spirit and scope of the invention except as defined in the appended claims.

We claim:

1. The process which comprises growing cultures of pertussis bacilli in soluble-starch broth for a period of about 48 hours at a temperature of 37° C. and under an atmosphere containing about 1 part by volume of carbon dioxide and about 4 parts by volume of oxygen, separating the bacteria from the broth by filtration and adding a preservative to the filtrate which is then suitable for use as a toxin.

2. The process which comprises growing cultures of pertussis bacilli in soluble-starch broth for a period of about 48 hours at a temperature of 37° C. and under an atmosphere containing about 1 part by volume of carbon dioxide and about 4 parts by volume of oxygen, separating the bacteria from the broth by filtration, adding to the toxin filtrate about 0.3% (by volume) formalin and incubating the mixture at a temperature of about 40° C. for a period of from about 2-4 weeks.

3. A process which comprises growing cultures of pertussis bacilli in shallow layers of soluble-starch broth at a temperature of about 37° C. and for a period of about 48 hours and under an atmosphere containing about 1 part by volume of carbon dioxide and about 4 parts by volume of oxygen, separating the bacteria from the liquid, and detoxifying the liquid by adding a small amount of formalin and maintaining it at a suitable temperature for a sufficient period of time to completely convert the toxin contained in the liquid to a toxoid.

4. A composition comprising a pertussis toxoid prepared in accordance with the process of claim 2, said composition being substantially free from pertussis bacteria and being a preserved material suitable for immunization against and for the treatment of whooping cough and having the power of neutralizing the necrotic factor of whole cultures of pertussis, and being further characterized by the production, when injected, of something akin to a true antitoxin with its attendant immunity, thereby serving as a prophylactic as well as being capable of causing specific immunological response.

EDWIN F. VOIGT.
SARA W. PHILLIPS.